July 14, 1964 F. J. CLARKE ETAL 3,140,653
APPARATUS FOR THE MECHANICAL TREADING OF GRAPES
Filed Jan. 12, 1962 3 Sheets-Sheet 1
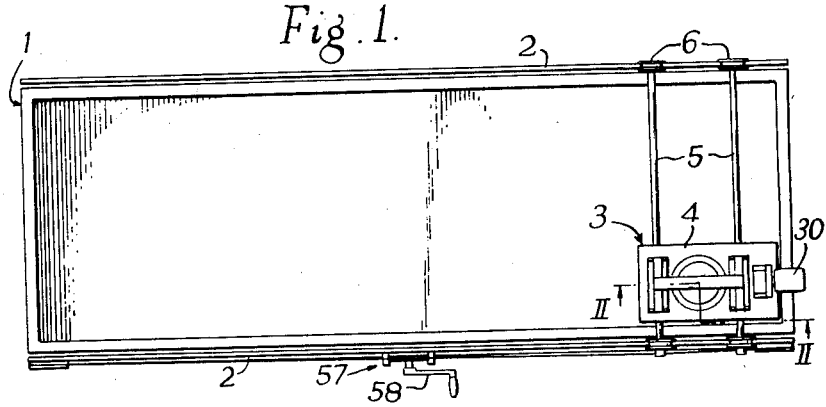
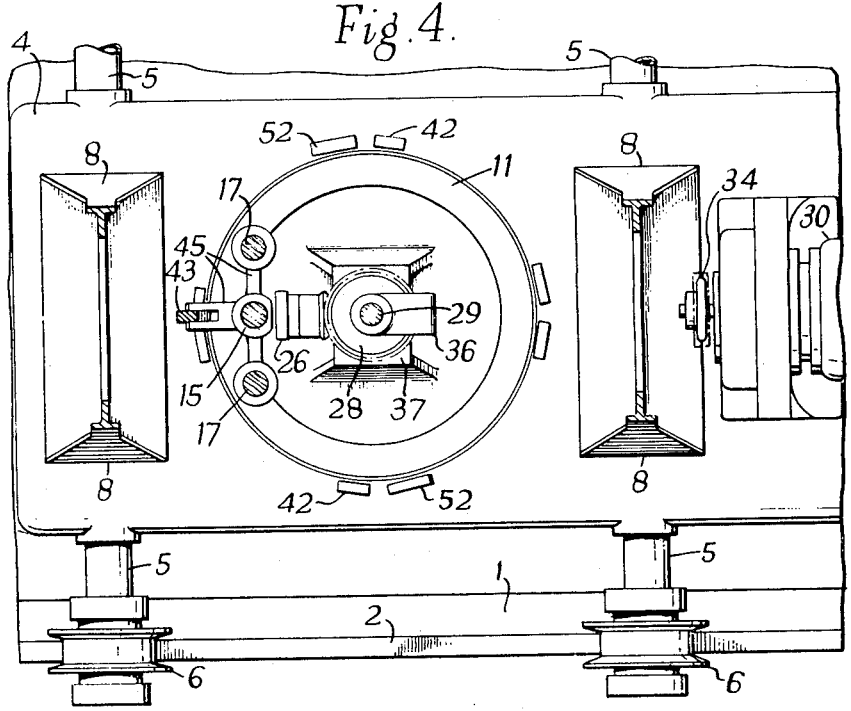
INVENTORS
Frank J. Clarke
John H. Smithes
BY Lemon Palmer,
Stewart & Estabrook
ATTORNEYS

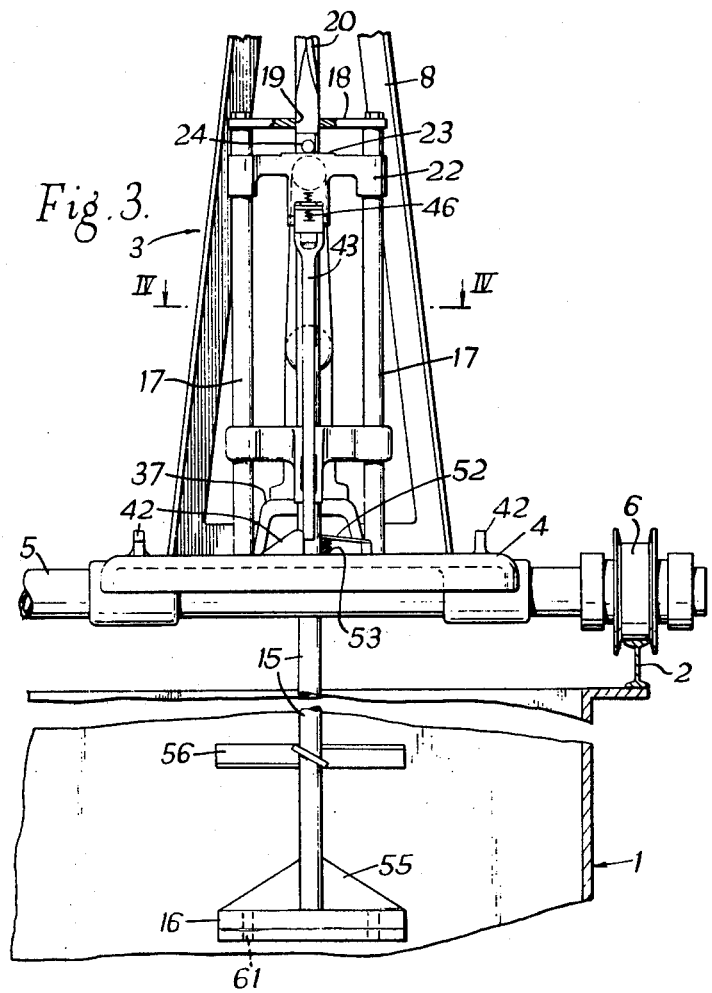

United States Patent Office 3,140,653
Patented July 14, 1964

3,140,653
APPARATUS FOR THE MECHANICAL
TREADING OF GRAPES
Frank Joseph Clarke, "Crestwood," Lynx Hill, East
Horsley, Surrey, England, and John Henry Smithes,
83 Travessa de Passos, Porto, Portugal
Filed Jan. 12, 1962, Ser. No. 165,912
Claims priority, application Great Britain Jan. 12, 1961
5 Claims. (Cl. 100—238)

This invention relates to an apparatus for mechanical treading of grapes, for use in the wine making industry.

It is the traditional practice in the better class wine making industry to express the juice or must from grapes for subsequent fermentation by treading the grapes underfoot. The harvested bunches of grapes are spread out in an elongated shallow vat and one or more persons walk up and down the length of the vat gradually pressing out the juice from the grapes and at the same time stirring and aerating the grapes and the juice with their feet.

This practice, although satisfactory from the point of view of the results achieved is costly and extravagant in the use of labour particularly since it takes a time of the order of sixteen hours.

It is accordingly an object of the invention to provide an apparatus for replacing this human process by a mechanical process.

The apparatus according to the invention comprises a vat for containing grapes to be squeezed, at least one platen carried by a separate spindle, a carriage having means for vertically guiding and oscillating the spindle and for rotating the spindle about its axis and means for moving the carriage over the vat along a path such that substantially the whole grape containing area of the vat is traversed by the platen, or by the platens in combination.

Advantageously the spindle of the paten, or of each platen, carries paddles or similar stirrers which may be adjustable as to their inclination to the vertical so as to obtain maximum stirring and aeration of the grapes and juice.

It is preferred that the conditions obtaining when the method and apparatus are in use should resemble those obtaining in the traditional method. To this end, the platen may be about a foot in diameter, have a weight of between 50 lbs. and that of an average adult, the vertical range of movement of the platen may be between about 24 and 30 inches, the frequency of vertical and rotary oscillation of the platen may be about 30 to 40 times per minute and the spindle axis may move horizontally through a distance equal to the diameter of the platen in each oscillation, that is at a speed of about 30 to 40 feet per minute. Furthermore, the platen may be arranged to complete one revolution in each direction during each vertical oscillation.

A grape treading apparatus according to the present invention will now be described with reference to the accompanying drawings, in which:

FIG. 1 is a view of the complete apparatus mounted on a vat,

FIG. 3 is a left end elevation view of FIG. 2 with the left hand member 8 removed, and FIG. 4 is a horizontal sectional view on the line IV—IV of FIG. 3.

Figure 2:
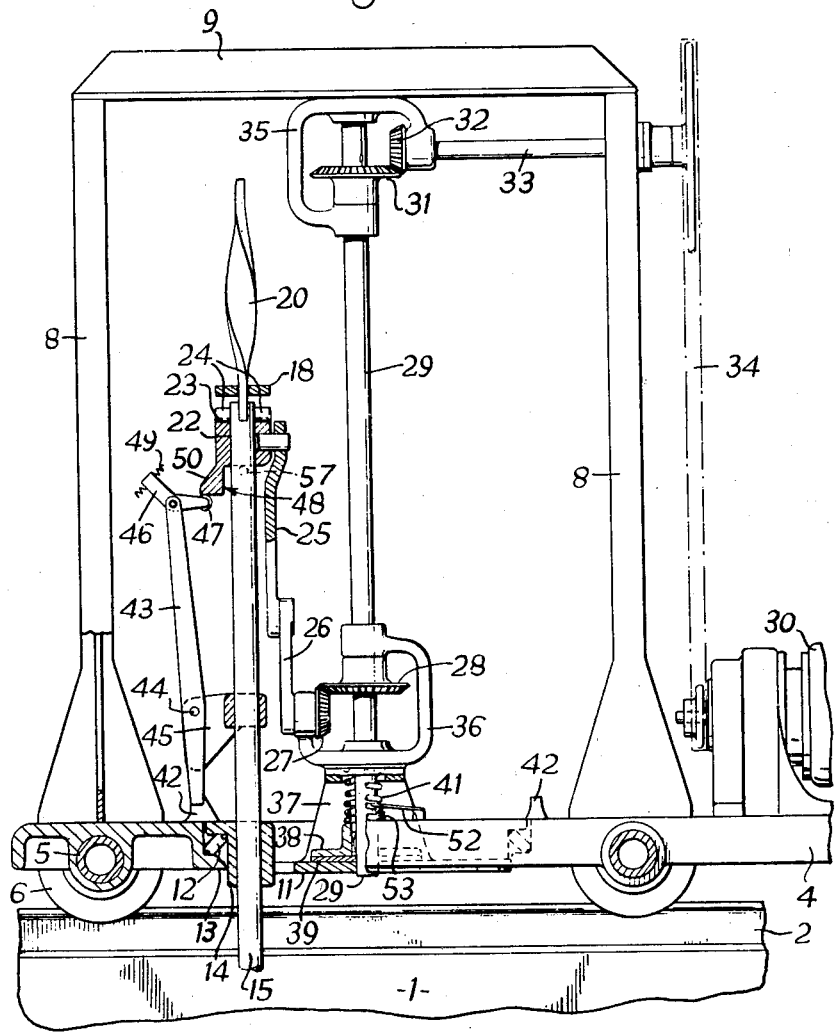
FIG. 2 is a partial elevation and a partial longitudinal sectional view on the line II—II of FIG. 1 on an enlarged scale.

In the apparatus shown in the drawings, the grapes are placed in an open elongated rectangular vat 1 (FIG. 2). Horizontal rails 2 are secured to the upper edges of each of the two longer side walls of the vat 1. A grape treading unit 3 has a base 4 through which pass two parallel bearer tubes 5 which extend over the width of the vat and are supported by means of doubly flanged wheels 6 on the rails 2. The wheels 6 are free to rotate about the bearer tubes 5 and are axially located by their bearings 7.

The base 4 carries a gantry (FIG. 2) comprising two vertical side frames 8, each mounted over one of the bearer tubes 5, and a top cross member 9.

Midway between the two side frames 8, the base 4 is formed with a central circular opening in which is disposed a turntable 11. The turntable 11 is supported by a roller bearing 12 on a circular flange 13 projecting horizontally from the lower edge of the opening in the base 4.

A bush 14 formed near the rim of the turntable 11, acts as a vertical guide for a spindle 15 carrying a grape-treading platen 16 (FIG. 3). Two vertical guide rods 17 on each side of the spindle 15 have their lower ends fixed in the turntable 11 and are joined at their upper ends by a bridge-piece 18.

The bridge-piece 18 is formed with a rectangular slot 19 through which passes, as a close sliding fit, a stiff twisted strip of metal 20 secured at its lower end to the upper end of the platen spindle 15. The total twist of the strip 20 from one end to the other is 360°.

A cross head 22 is engaged on the guide rods 17 so as to be freely slidable thereon. The middle of the top surface of the cross head is formed as a flat annular race 23 for a pair of diametrically opposed rollers 24 carried by the upper end of the platen spindle 15. The rollers 24 are free to rotate, being mounted on a horizontal transverse pin which passes through both the upper end of the platen spindle and the lower end of the twisted strip 20.

The cross head 22 and hence the platen spindle 15 is arranged to be reciprocated on the guide rods by a connecting rod 25 driven by a crank arm 26 which in turn is driven by an electric motor 30 through bevel gears 27 and 28, a vertical shaft 29, further bevel gears 31 and 32, a horizontal shaft 33 and a chain and sprocket drive 34. The bevel gears 31 and 32 are carried in an upper housing 35 secured to the cross member 9. The bevel gears 27 and 28 are carried in a lower housing 36 which is secured to the turntable 11 by means of a pedestal 37.

The shaft 29 continues downwards into the pedestal 37 and is splined at its lower end. A friction clutch plate 38 carrying a friction lining 39 on its lower face is engaged on the splines on the shaft 29 and is urged downwards into frictional contact with the turntable 11 by a spring 41.

The base 4 carries four abutments 42 spaced at 90° around the edge of the turntable opening. A vertical lever 43 is pivoted at 44 on a bracket 45 fixed to the guide rods 17 and has a pawl 46 pivoted to it at its upper end. The lower end of the lever 43 normally bears against one of the abutments 42, thereby preventing rotation of the turntable.

The pawl 46 carries a roller 47 which cooperates with a cam 48 on the cross head 22. The pawl 46 is arranged so that as the cross head 22 moves downwards from the position shown in FIG. 2, the pawl 46 can rock clockwise against a spring 49 so that the roller 47 rides over the cam 48 and becomes disengaged therefrom without moving the lever 43.

However, as the cross head 22 nears the end of an upward stroke, the roller 47 rides down an inclined face 50 of the cam 48 and moves the lever 43 anti-clockwise (FIG. 2) thereby disengaging its lower end from the abutment 42 so that the turntable can be rotated by the shaft 29 driving through the friction clutch 38, 39.

At the end of the upward stroke of the cross head 22, the roller 47 drops off the lower end of the inclined face 50 and the lever 43 swings back to its original position to contact the next abutment 42 and arrest the rotation of the turntable 11.

A inclined brake plate 52 is hinged at its lower end to the base 4 near each abutment 42 and has its upper end urged upwards by a small spring 53 so as to engage frictionally the lower end of the lever 43 as it moves into contact with the abutment 42. This serves to slow down the turntable and thus to prevent damage to the abutments 42.

The platen 16 (FIG. 3) is a circular disc about a foot in diameter and is secured to the lower end of the platen spindle 15. Two triangular webs 55 are fixed to the upper surface of the platen and to the spindle 15 and act as paddles to stir and aerate the grapes and juice in the vat. One or more sets of further paddles 56 may be mounted on the spindle 15 above the platen 16 so as to break up the scum which forms on the surface. The platen may be perforated as at 61.

In use, the vat is nearly filled with grapes and the electric motor 30 is started. As long as the lower end of the lever 43 remains in contact with one of the abutments 42, the clutch 39 slips and the motor 30 drives the crank 26 which first lowers the cross head 22 and then lifts it. As the cross head 22 moves downwards, the platen 16 and its spindle 15 can move downwards at a speed not greater than that of the cross head. As the spindle 15 moves downwards, the twisted strip 20 moves through the fixed slot 19 which thereby rotates the platen 16 and the paddles 55 and 56.

In this embodiment, the crushing and stirring of the grapes is effected by the platen falling and rotating under its own weight, about 70 lbs. If desired, however, the platen spindle may be driven downwards positively through an additional set of rollers 24 on the spindle 15 cooperating with a flat annular race on the underside of the cross head 22.

As the cross head 22 moves upwards, the race 23 engages the rollers 24 and thereby both lifts the platen spindle and platen with the cross head and forces the spindle to rotate, in the opposite direction, as the twisted strip 20 passes through the slot 19, causing further stirring of the grapes.

As the cross head 22 nears its uppermost position, the lever 43 is moved clear of the abutment 42. The vertical shaft 29 can now drive the turntable 11, through the clutch 29, round to the next abutment 42, whereupon the cycle is repeated. It will be noted that the platen is near its uppermost position while the turntable is rotating and can thus be clear of the grapes and juice.

As shown in FIG. 1, the treading unit 3 can be moved backwards and forwards on the rails 2 along the length of the vat by a chain and sprocket drive 57 operated by a handle 58. Moreover the treading unit 3 can be moved laterally on the tubes 5 as required by hand.

The treading operation for the production of port continues for about 8 hours until the operator observes that the initial fermentation is sufficiently established. Thereafter he can continue the process intermittently or continuously in one region or all over the area of the vat as necessary until he decides that the must is ready to be drawn off, for example into casks.

Thus only one operator is required for a vat which may measure 20 ft. by 10 ft. or even larger.

In an alternative embodiment (not shown) of the treading unit, two platens are provided and are reciprocated 180° out of phase with each other. The platen spindles are guided in bushes in the base of the unit, the turntable with its friction driving clutch being dispensed with.

In another embodiment intended for experimental or small scale wine production, the cross head is reciprocated manually by means of a hand lever. The range of vertical movement of the cross head is smaller than in the case of the motor driven embodiments, so that the vertical position of the hand lever fulcrum is made adjustable. The base is mounted by means of flanged wheels on a circular track on the rim of a small vat.

What we claim is:

1. Wine making apparatus comprising an elongated parallel-sided shallow vat for holding grapes, a carriage having support members extending across the width of said vat and supported on the parallel side walls of said vat to be movable therealong, said carriage also being movable along said support members across the width of said vat, a horizontal turntable rotatably mounted in an opening in said carriage, a platen spindle supported in said turntable and constrained for helical movement about and along the longitudinal axis thereof eccentrically of the axis of said turntable, said platen spindle having a lower portion depending from said turntable and carrying a platen and stirring paddles, a motor on said carriage, a shaft coaxial with said turntable and coupled at its lower end to said turntable through a friction clutch, a crank member journaled to said turntable at a point radially displaced from the axis thereof, bevel gearing connecting said crank member and said shaft, guide bars mounted on said turntable, a cross head mounted for sliding movement parallel to said platen spindle on said guide bars, a connecting rod interconnecting said cross head with an eccentric part of said crank member, a thrust-bearing between said cross head and said platen spindle to transmit upward movement of said cross head to said spindle while permitting rotation of said platen spindle, a plurality of abutments on said carriage angularly displaced around said turntable, a detent lever pivoted to said turntable and biased to present its lower end in a position to engage any of said abutments to arrest said turntable, and a pawl mounted on said detent lever and disposed to be engaged by said cross head only during downward movement thereof to swing said detent lever clear of said abutment whereby said turntable can be rotated by said motor through said friction clutch until said detent lever engages the next of said abutments.

2. An apparatus for expressing must from grapes in a vat and assisting fermentation of said must, comprising:
   a carriage;
   a turntable mounted on said carriage;
   means for rotating said turntable about its axis;
   a platen spindle guided in said turntable for vertical movement and rotation about its axis, eccentrically of said turntable;
   means for vertically oscillating and rotating the platen spindle about its axis;
   a platen carried by the lower part of said platen spindle; and
   means for moving the carriage over the vat in such a manner that substantially the whole grape containing area of said vat is traversed by said platen.

3. Apparatus according to claim 2, wherein the means for vertically guiding and oscillating the platen spindle and for rotating the spindle about its axis include a vertically guided cross head, means to rotatably mount said spindle in said cross head to carry the spindle upward therewith for vertically recirocating the cross head and means for constraining the spindle to move helically about its axis relative to the turntable.

4. Apparatus according to claim 3, wherein the cross head is oscillated by a crank which is connected through a slip coupling to the turntable and wherein a trip mechanism prevents rotation of the turntable except when the platen is approaching the uppermost part of its travel.

5. Apparatus according to claim 2 wherein the rotation of the platen spindle is oscillatory and is synchronized with the vertical oscillation of said platen spindle.

References Cited in the file of this patent

UNITED STATES PATENTS

| | | |
|---|---|---|
| 597,970 | Ferrell | Jan. 25, 1898 |
| 1,264,645 | Harrison | Apr. 30, 1918 |
| 1,476,620 | Kilmartin | Dec. 4, 1923 |
| 2,747,500 | Weatherly | May 29, 1956 |

FOREIGN PATENTS

| | | |
|---|---|---|
| 448,359 | France | Nov. 23, 1912 |
| 881,325 | France | Jan. 22, 1943 |